United States Patent
Domulewicz, Sr.

[15] 3,662,986
[45] May 16, 1972

[54] STOPPER BLOCK

[72] Inventor: Raymond J. Domulewicz, Sr., 693 Bauernschmit Drive, Baltimore, Md. 21221

[22] Filed: Feb. 25, 1970

[21] Appl. No.: 13,899

[52] U.S. Cl. ..........................251/144, 137/625.48, 251/176, 251/195, 251/178
[51] Int. Cl. ..........................................................F16k 5/00
[58] Field of Search ..................137/625.44, 625.48, 625.42; 251/176, 177, 178, 193, 195, 196, 181, 144

[56] References Cited

UNITED STATES PATENTS

| 277,328 | 5/1883 | Murphy | 251/176 |
|---|---|---|---|
| 1,189,722 | 7/1916 | Murphy | 251/176 |
| 1,245,961 | 11/1917 | Oswald | 251/195 |
| 1,023,104 | 4/1912 | Carpenter | 251/181 X |
| 2,693,815 | 11/1954 | Gould | 251/181 X |
| 3,214,132 | 10/1965 | Goldthorpe | 251/174 X |
| 3,511,471 | 5/1970 | Rossi | 251/144 |

FOREIGN PATENTS OR APPLICATIONS

| 1,155,082 | 11/1957 | France | 251/144 |
|---|---|---|---|

*Primary Examiner*—Harold W. Weakley
*Attorney*—J. Wesley Everett and George L. Brehm

[57] ABSTRACT

A valve for high temperature liquids, such as molten metals, having both valve member and valve seat composed of heat resistant material such as ceramic, and having the valve member shiftable in a tapered seat positioned laterally of the flow of the liquid through the valve with spring means to urge the valve member into wedging engagement with the seat to maintain close engagement between these members in all positions and prevent leakage of the liquid between the valve member and seat.

1 Claim, 7 Drawing Figures

RAYMOND J. DOMULEWICZ
INVENTOR

RAYMOND J. DOMULEWICZ
INVENTOR

BY:
ATTORNEY

AGENT

STOPPER BLOCK

The present invention relates to valves and more particularly to valves for liquids of very high temperature such as, for example, molten metals, where ordinary materials, especially metals normally used for valve parts would be entirely unsuitable and, in fact, would be apt to soften or melt due to the high temperatures encountered.

It is one object, therefore, to provide a valve which can withstand extremely high temperatures without deterioration or failure.

Another object is to provide such a valve in which the working parts, the valve member and valve seat, are made of ceramic or similar heat resistant material.

Still another object is to provide such a valve in which none of the high temperature liquid can remain in the valve and possibly solidify to prevent further functioning of the device.

An additional object is to provide such a valve with means to maintain the valve member in close sliding relation with the valve seat and thus prevent leaks therebetween.

The objects above mentioned and other objects and advantages will become more apparent as this description proceeds and reference is had to the accompanying drawings forming a part of this specification.

Figure 1:
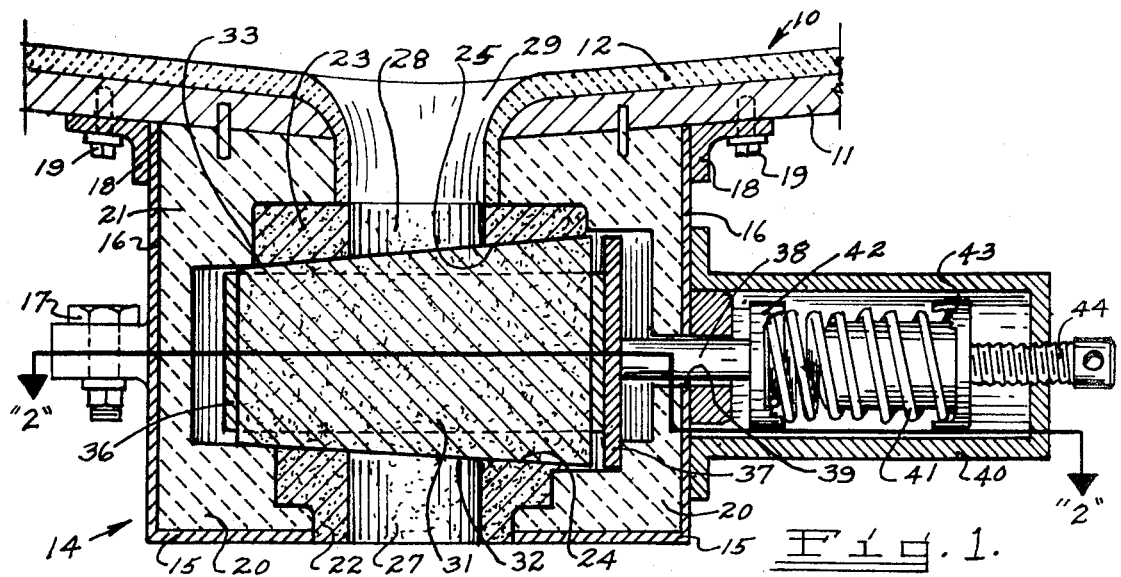
FIG. 1 is a vertical sectional view through a valve according to my invention, attached to ladle for molten metal.
Figure 2:
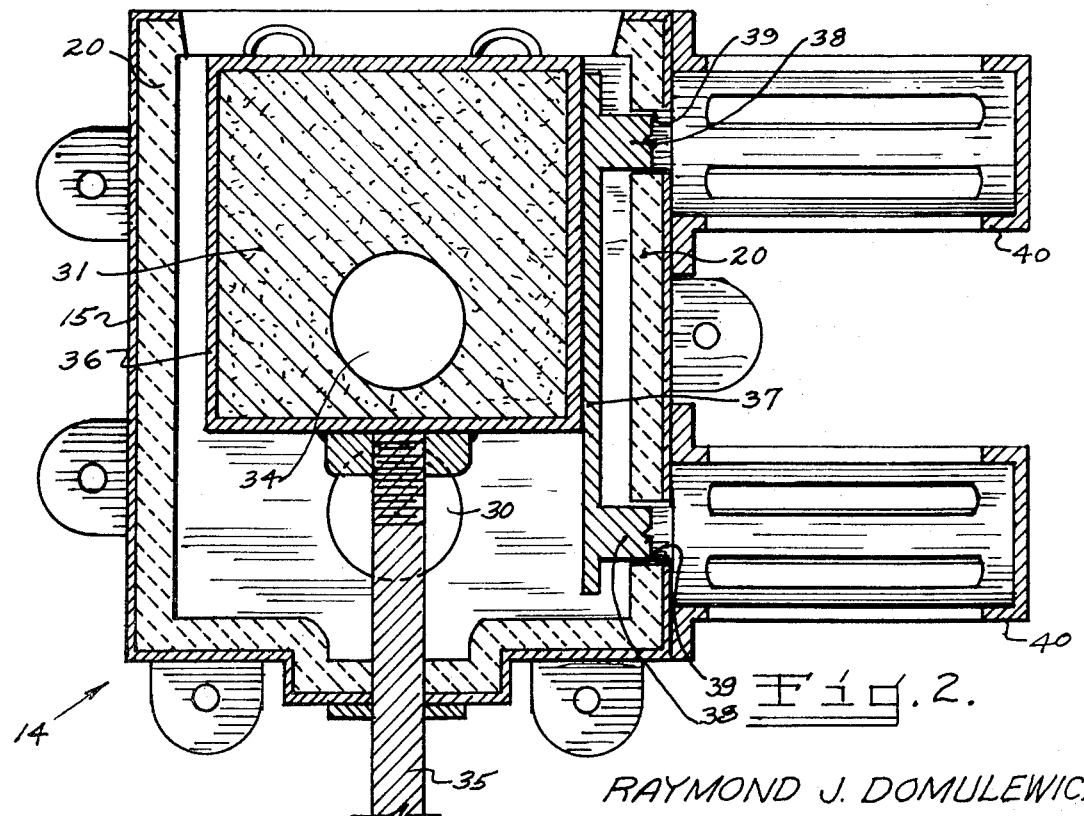
FIG. 2 is a sectional view substantially on the line 2-2 of FIG. 1.

Referring now in detail to the drawing, and for the present to FIGS. 1, 2, 6 and 7 thereof, 10 generally designates a ladle for molten metal which is in the form of an outer metal shell 11 lined with heat resistant material such as ceramic, fire brick or similar material 12.

Ladles of the type contemplated herein are employed to carry molten metal from a furnace to casting molds and the like. It is necessary therefore to have an outlet in the ladle indicated at 13 and a valve to enable a person to start and stop the flow of metal from the ladle to the mold with accuracy. The valve, which is the subject matter of concern in this application, is generally designated 14.

The valve 14 comprises an outer housing of metal or the like which is made in two halves 15 and 16 held together by bolts 17 and said outer housing is attached to the shell 11 of the ladle by means of flanges 18 and bolts 19 or any other suitable means as desired.

The housing 15, 16 is lined with a high heat resistant material and insulator such as fire brick or its equivalent. The fire brick lining is shaped to the inside of the housing and is divided into two sections 20 and 21 on the same plane as that of the divided outer housing 15, 16.

Within the fire brick lining and supported thereby are valve seat members 22 and 23 of ceramic or other high heat resistive material. The outer surfaces of the valve seat members fit the cavities provided therefor in the fire brick lining members while their inner facing surfaces are inclined with respect to each other as seen at 24 and 25 respectively to form a rather acute angle between them. The valve seat members have openings 2 7 and 28 therein which align with the outlet port or opening 29 in the ladle. The lower valve seat 22 has an additional opening 30 which will be described hereinafter.

The valve member 31 is slidably positioned between the inclined facing surfaces 24 and 25 of the valve seat members. It also is made of ceramic or equivalent heat resistive material and has opposite inclined faces 32 and 33 which match the angle between surfaces 24 and 25 of the valve seats.

The valve member is provided with an opening 34 which can be made, in one position of the valve member, to register with the openings 27 and 28 in the valve seat members to open the valve or which, in another position, to be moved out of position with the openings 27 and 28 to close the valve. In the "off" or closed position, however, the valve opening 34 can be brought into registry with the opening 30 in the lower valve seat member so that any molten metal trapped in the opening 34 between the seat members may be discharged through opening 30 before it can solidify and render the valve wholly inoperative.

In order to operate the valve, a valve stem 35 which extends outwardly of the valve casing is provided, and is attached to the metal frame or band 36 which surrounds the ceramic valve member and holds the same.

To insure close contact between the inclined surfaces on the valve seats and valve member in all positions of the latter with respect to the former, a pressure plate 37 is made to bear with adjustable pressure against the side of the band 37 and thus against the valve member. The pressure plate has one or more studs 38 attached thereto which latter extend outwardly through openings 39 in the casing and enter cage like spring housings 40 which contain compression springs 41. Each compression spring is located between end plates 42 and 43, the plate 42 bearing on the stud 38 and the plate 43 positioned between the free end of the spring and an adjustable screw 44 threaded in the cage or housing 40 whereby the pressure of the spring on the stud 38 may be varied.

Figure 3:
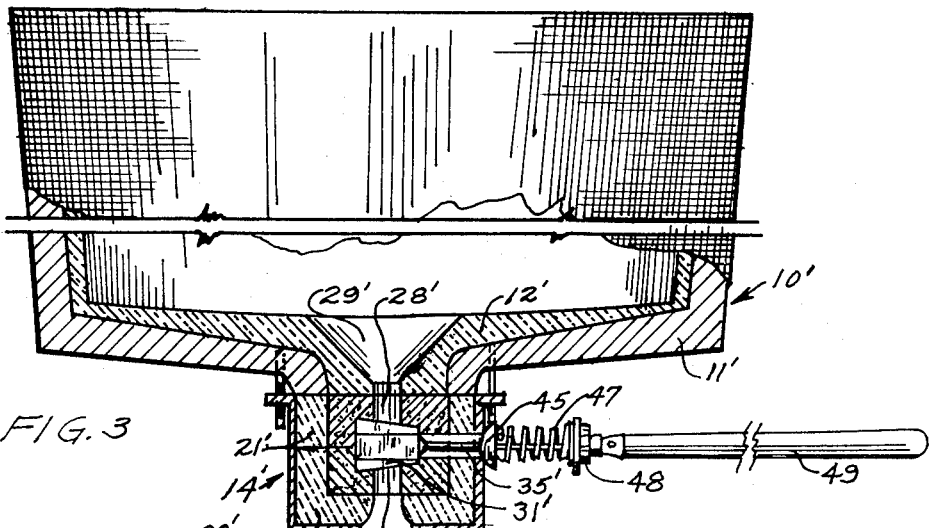
FIG. 3 is a vertical sectional view similar to FIG. 1 of a modified form of valve.
Figure 4:
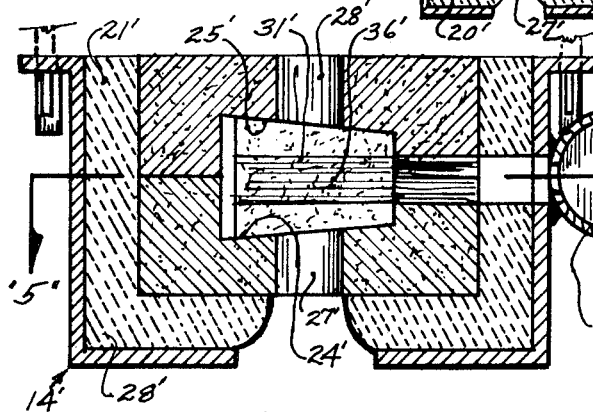
FIG. 4 is a sectional view of the valve of FIG. 3 on an enlarged scale.
Figure 5:
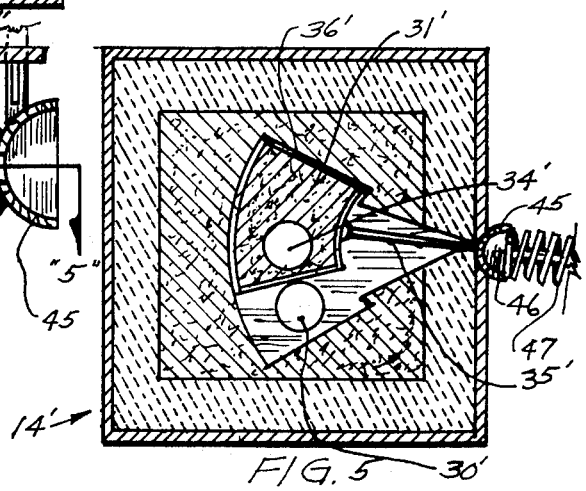
FIG. 5 is a horizontal section on line 5-5 of FIG. 4.
Figure 6:
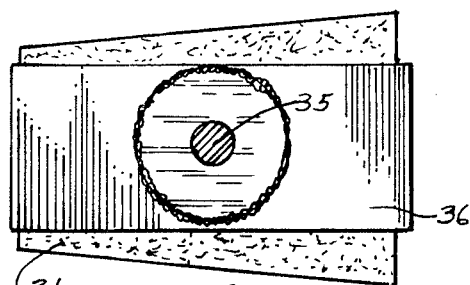
FIG. 6 is a side view, on an enlarged scale, of the valve member of the form shown in FIG. 1 and 2.
Figure 7:
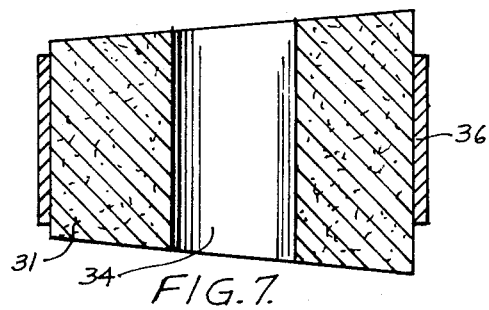
FIG. 7 is a vertical sectional view of the valve member of FIG. 6.

The modified form of the device shown in FIGS. 3, 4 and 5 is quite similar to that just described with the exception that the valve seats and valve member have cooperating surfaces which are conical rather than plane and in which the valve member is moved in an arcuate path on the valve seats instead of a straight line path.

In the modified form, the ladle 10', outer shell 11' and lining 12' are quite similar to their counter parts in the first form. The valve 14' has a substantially square outer housing and is provided with fire brick lining 20' and 21' and valve seats 22' and 23' of ceramic or like material within the fire brick lining. The valve seats have converging surfaces 24' and 25' which converging surfaces are actually oppositely positioned conical surfaces.

A valve member 31' having upper and lower conical surfaces to match those of the upper and lower seat members is positioned between the seat members and is movable in an arcuate path therebetween. The seat members have aligned openings 27' and 28' which communicate with the outlet port 29' of the ladle and the valve member has an opening 34' therethrough which may be aligned with openings 27' and 28' to turn the valve on or shifted laterally therefrom to turn the valve off.

Similar to the first form described the bottom valve seat has a second opening 30' which aligns with the opening in the valve member when in its "off" position to drain any molten metal therefrom to prevent the same from solidifying on the opening 34' and fouling the valve.

The valve member is held in a metal band or frame 36' and a valve stem 35' extends therefrom and out through an opening in the valve housing.

Outwardly of the opening in the valve housing a ball socket 45 is fixed and the valve stem is equipped with a slidable ball 46 which seats in the ball socket. A spring 47 positioned between an abutment 48 and the ball pushes the ball into the socket and exerts a pull on the valve stem and thus the valve member to draw the same into the converging surfaces of the valve seats.

A handle 49 is fixed at the end of the valve stem and it can be readily seen that swinging the lever from side to side will shift the valve member between the seats from "off" to "on" position or vice versa and that the ball and socket joint will function as a fulcrum on which the valve stem may swing.

Having described preferred forms of my invention, what I claim as new and desire to secure by Letters Patent is:

1. A combination stopper and valve assembly for a vessel carrying and dispensing molten metals, wherein the vessel is provided with an outlet adjacent its bottom and means for affixing the combination stopper and valve assembly over the vessel outlet, comprising:
   a. said stopper having a relatively thin metal housing and a ceramic interior both being divided into two sections along the same line and means for clamping the two sections together;
   b. said stopper having an opening extending therethrough parallel with the vertical axis of the vessel for conveying the molten metal through the said stopper;
   c. said stopper having a cavity within the ceramic material of substantially rectangular form, the cavity being in a plane perpendicular to the opening through the stopper intersecting the opening and dividing the same into a inner and outer section, the area adjacent the inner ends forming a valve seat;
   d. the opposite sides of the cavity having the valve seats being in a plane substantially along horizontal parallel surfaces and having the said side walls inclined to the one side of the cavity to form a converging surface substantially throughout the length of the cavity to form a tapered valve seat about the inner ends of the two sections of the stopper opening;
   e. a tapered slideable valve block being of the same taper as the tapered surfaces of the said cavity adapted to slide in close contact with the tapered valve seats;
   f. said valve slide block having at least one opening therethrough adapted to register with the two stopper sections openings when in one position for withdrawing the molten metal flow from the vessel and to block off the said metal flow from the stopper openings when in another position and means for operating said slideable block;
   g. means for keeping the tapered slideable block in contact with the tapered valve seats comprising a pressure plate adapted to contact the wider edge of the tapered valve block for urging the block toward the converging sides of the cavity and in contact with the valve seats, said pressure plate having means extending outwardly through the stopper outer casing for engaging a pressure means, said pressure means comprising a compression spring adapted to engage the outwardly extending means of the pressure plate;
   h. means secured to the outer casing for retaining the compressing spring and means for adjusting the pressure of the compressing spring on the plate extended means.

* * * * *